US012396047B2

(12) United States Patent
Dange et al.

(10) Patent No.: US 12,396,047 B2
(45) Date of Patent: Aug. 19, 2025

(54) METHOD AND USER EQUIPMENT FOR POWER SAVING THROUGH OPTIMIZED EARLY MEASUREMENT IN CELLULAR NETWORK

(71) Applicant: Samsung Electronics Co., Ltd., Suwon-si (KR)

(72) Inventors: Amit Anandrao Dange, Bangalore (IN); Kailash Kumar Jha, Bangalore (IN); Aman Agarwal, Bangalore (IN); Abishek Kawsan, Bangalore (IN); Nitesh Pushpak Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 17/871,421

(22) Filed: Jul. 22, 2022

(65) Prior Publication Data
US 2023/0032513 A1 Feb. 2, 2023

Related U.S. Application Data

(63) Continuation of application No. PCT/KR2022/010785, filed on Jul. 22, 2022.

(30) Foreign Application Priority Data

Jul. 27, 2021 (IN) .............................. 202141033620
Jul. 18, 2022 (IN) ............................ 2021 41033620

(51) Int. Cl.
*H04W 76/15* (2018.01)
*H04J 11/00* (2006.01)
(Continued)

(52) U.S. Cl.
CPC ......... *H04W 76/15* (2018.02); *H04J 11/0076* (2013.01); *H04W 24/10* (2013.01); *H04W 48/20* (2013.01)

(58) Field of Classification Search
CPC .... H04J 11/0076; H04L 5/001; H04L 5/0098; H04L 65/1016; H04W 24/10;
(Continued)

(56) References Cited

U.S. PATENT DOCUMENTS

2019/0132755 A1  5/2019  Dhanapal et al.
2019/0150014 A1  5/2019  Virtej et al.
(Continued)

FOREIGN PATENT DOCUMENTS

WO  2018/231006 A1  12/2018
WO  2020/167205 A1   8/2020
(Continued)

OTHER PUBLICATIONS

Radio Resource Control (RRC); Protocol specification, 3GPP TS 38.331 version 16.4.1 Release 16 (Apr. 2021) (Year: 2021).*
(Continued)

*Primary Examiner* — Ayaz R Sheikh
*Assistant Examiner* — David Zhijun Sun
(74) *Attorney, Agent, or Firm* — Jefferson IP Law, LLP

(57) ABSTRACT

A method, and a user equipment (UE) for power saving through optimized early measurement of frequencies for secondary cell setup in cellular network are provided. The UE initiates a service with a base station associated with a primary cell supporting the early measurement of the frequencies for the secondary cell (SCell) setup. The UE determines whether the service belongs to one of a first service set, and a second service set. The early measurement of the frequencies for the S Cell setup is temporarily terminated, and/or the transmission of an early measurement report comprising the one or more frequencies for the SCell setup to the base station is temporarily terminated. Alternatively, the UE performs the early measurement of the frequencies for the SCell setup and transmits the early
(Continued)

measurement report to the base station when the service belongs to the second service set.

20 Claims, 7 Drawing Sheets

(51) Int. Cl.
  *H04W 24/10* (2009.01)
  *H04W 48/20* (2009.01)
(58) Field of Classification Search
  CPC . H04W 48/20; H04W 52/0251; H04W 68/00; H04W 68/005; H04W 76/15; H04W 76/27; H04W 76/34; H04W 76/50; Y02D 30/70
  See application file for complete search history.

(56) References Cited

U.S. PATENT DOCUMENTS

| | | | |
|---|---|---|---|
| 2020/0162974 | A1 | 5/2020 | Hou et al. |
| 2020/0252823 | A1 | 8/2020 | Kim et al. |
| 2020/0396633 | A1 | 12/2020 | Tseng et al. |
| 2021/0007000 | A1 | 1/2021 | Kim et al. |
| 2021/0153055 | A1 | 5/2021 | Lee et al. |
| 2022/0116805 | A1* | 4/2022 | Wang .................. H04W 24/08 |
| 2022/0124532 | A1* | 4/2022 | Rugeland ............. H04W 76/27 |
| 2022/0272562 | A1 | 8/2022 | Wang |
| 2023/0018140 | A1* | 1/2023 | Catovic ................. H04W 68/00 |
| 2023/0262501 | A1* | 8/2023 | Rugeland ............. H04W 24/10 370/252 |

FOREIGN PATENT DOCUMENTS

| | | |
|---|---|---|
| WO | 2020/202101 A1 | 10/2020 |
| WO | 2020/251466 A1 | 12/2020 |
| WO | 2021/016734 A1 | 2/2021 |
| WO | 2021/051247 A1 | 3/2021 |
| WO | 2021/101428 A1 | 5/2021 |

OTHER PUBLICATIONS

International Search Report and Written Opinion dated Oct. 21, 2022, issued in International Patent Application No. PCT/KR2022/010785.
Indian Office Action dated Feb. 28, 2023, issued in Indian Patent Application No. 202141033620.
Status Report to TSG, XP 52336670, Multi-RAT Dual-Connectivity and Carrier Aggregation enhancements (LTE, NR), 3GPP TSG RAN meeting #88-e, Electronic meeting, Jun. 29-Jul. 3, 2020, RP-200779, Jun. 22, 2020.
Extended European Search Report dated Aug. 14, 2024, issued in European Application No. 22849816.8.

* cited by examiner

METHOD AND USER EQUIPMENT FOR POWER SAVING THROUGH OPTIMIZED EARLY MEASUREMENT IN CELLULAR NETWORK

CROSS-REFERENCE TO RELATED APPLICATION(S)

This application is a continuation application, claiming priority under § 365(c), of an International application No. PCT/KR2022/010785, filed on Jul. 22, 2022, which is based on and claims the benefit of an Indian Provisional patent application number 202141033620, filed on Jul. 27, 2021, in the Indian Patent Office, and of an Indian Complete patent application number 202141033620, filed on Jul. 18, 2022, in the Indian Patent Office, the disclosure of each of which is incorporated by reference herein in its entirety.

TECHNICAL FIELD

The disclosure relates to frequency measurement for carrier aggregation (CA) or dual connectivity (DC) in a cellular network. More particularly, the disclosure relates to a method and a user equipment (UE) for performing an early measurement of frequencies for secondary cell (SCell) setup.

BACKGROUND

In current fifth generation (5G) networks, demand for larger bandwidth associated with data transfer operations by a user equipment (UE) is growing day by day. Utilizing carrier aggregation (CA) and dual connectivity (DC) configuration setup combined, the UE is connected to two base stations and utilizes multiple cells in each, thereby significantly increasing the maximum bandwidth for the UE. Particularly, DC configuration setup enables the UE for simultaneously connecting to the two serving base stations such as a master node (MN), and a secondary node (SN). Further, the CA configuration setup enables the UE for simultaneously connecting with multiple cells of each of the serving base station so that the UE is capable to operate at multiple frequencies at the same time.

In third generation partnership project (3GPP) release 16, an early measurement feature has been introduced to ensure faster setup or reconfiguration of the CA/DC. The early measurement feature enables the UE to perform frequency measurement for availability of SCells when the UE is in a radio resource control (RRC) idle state or an RRC inactive state. The UE generates an early measurement report based on the performed frequency measurement. While performing a transition to an RRC connected state from one of the RRC idle state or an RRC inactive state, the UE transmits the generated early measurement report to a base station associated with a primary cell (PCell) to reduce delay in setting up multi-radio (MR) DC or CA. Based on the received early measurement report, the base station associated with the PCell performs SCell addition.

However, in some scenarios, the UE initiates certain services that does not require SCells, which degrades utilization of network resources. Further, the CA framework is based on stringent network coordination and availability of UE assistance information via UE measurement reporting. The operation relies on network configuring and deciding whether to keep the Scell activated for maximum peak data rate or deactivated for minimized power consumption while maintaining CA. The signaling performed post SCell addition increases computational complexity and also power consumption at both the UE and the base station. Further, the UE supporting early measurement feature, continuously perform frequency measurements for the SCell setup and transmit the early measurement reports to the base station irrespective of nature of service initiated by the UE, which leads to further rise in power consumption, network resources and signaling overhead. Further, high power consumption and inferior battery performance results in poor user experience from the UE perspective.

FIGS. 1A and 1B show sequence flow diagrams illustrating early measurement reporting and unnecessary addition of secondary cell (SCell) in a cellular network, according to the related art.

Referring to FIG. 1A, at operation 107, the base station 103 associated with the PCell transmits a radio resource control (RRC) connection release message with a measure idle configuration (alternatively referred as measIdleConfig) information element (IE) to the UE. At operation 109, the UE 101 enters to an RRC idle state in a new radio (NR) cell supporting an early measurement feature. In the idle state, the UE 101 performs idle mode measurements for CA and DC capable frequencies based on the measIdleConfig IE. At operation 111, the UE 101 transmits an RRC setup request message along with an EstablishmentCause IE to the base station 103 associated with the PCell for performing a transition from the RRC idle state to an RRC connected state. At operation 113, the base station 103 associated with the PCell transmits an RRC setup message to the UE 101 in response to receiving the RRC setup request message. At operation 115, the UE 101 transmits an RRC setup complete message along with idleMeasAvailable IE to the base station 103 associated with the PCell. At operation 117, the base station 103 associated with the PCell transmits SCell setup configuration to the UE 101 for a SCell addition. At operation 119, the UE 101 gets connected to a base station 105 associated with the SCell.

Referring to FIG. 1B, at operation 121, the base station 103 associated with the PCell transmits an RRC connection suspend message with the measIdleConfig IE to the UE. At operation 123, the UE 101 enters to an RRC inactive state in the NR cell supporting the early measurement feature. In the inactive state, the UE 101 performs inactive mode measurements for CA and DC capable frequencies based on the measIdleConfig IE. At operation 125, the UE 101 transmits an RRC resume request message along with a ResumeCause IE to the base station 103 associated with the PCell for performing a transition from the RRC inactive state to the RRC connected state. The ResumeCause IE indicates a type of service device requested from the cellular network. At operation 127, the base station 103 associated with the PCell transmits an RRC resume message to the UE 101 in response to receiving the RRC resume request message. At operation 129, the UE 101 transmits an RRC resume complete message along with idleMeasAvailable IE to the base station 103 associated with the PCell. At operation 131, the base station 103 associated with the PCell transmits SCell setup configuration to the UE 101 for a SCell addition. At operation 133, the UE 101 gets connected to a base station 105 associated with the SCell.

Referring to FIGS. 1A and 1B, early measurement reporting according to the related art does not determine whether service initiated by the UE 101 requires SCell setup prior to performing early measurement of frequencies and transmitting the early measurement report to the base station 103 associated with the PCell. This results in increased power consumption and signalling overhead while causing wastage of network resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and user equipment for power saving through optimized early measurement in cellular network.

Additional aspects will be set forth in part in the description which follows and, in part, will be apparent from the description, or may be learned by practice of the presented embodiments.

In accordance with an aspect of the disclosure, a method for power saving through optimized early measurement of one or more frequencies for secondary cell (SCell) setup in cellular network is provided. The method includes initiating, by a user equipment (UE), a service with a base station associated with a primary cell (PCell) supporting the early measurement of the one or more frequencies for the SCell setup, determining, by the UE, whether the initiated service belongs to one of a first service set, and a second service set, and performing one of temporarily terminating one of the early measurement of the one or more frequencies for the SCell setup, and transmission of an early measurement report comprising the one or more frequencies for the SCell setup to the base station associated with the PCell when the initiated service belongs to the first service set, and performing the early measurement of the one or more frequencies for the SCell setup and transmitting the early measurement report to the base station associated with the PCell when the initiated service belongs to the second service set.

In accordance with another aspect of the disclosure, a user equipment (UE) for power saving through optimized early measurement of one or more frequencies for secondary cell (SCell) setup in cellular network is provided. The UE includes a processor, and a memory communicatively coupled to the processor, wherein the memory stores processor-executable instructions, which, on execution, cause the processor to initiate a service with a base station associated with a primary cell (PCell) supporting the early measurement of the one or more frequencies for the SCell setup, determine whether the initiated service belongs to one of a first service set, and a second service set, and perform one of temporarily terminating one of the early measurement of the one or more frequencies for the SCell setup, and transmission of an early measurement report comprising the one or more frequencies for the SCell setup to the base station associated with the PCell, when the initiated service belongs to the first service set, and performing the early measurement of the one or more frequencies for the SCell setup and transmitting the early measurement report to the base station associated with the PCell when the initiated service belongs to the second service set.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE ACCOMPANYING DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
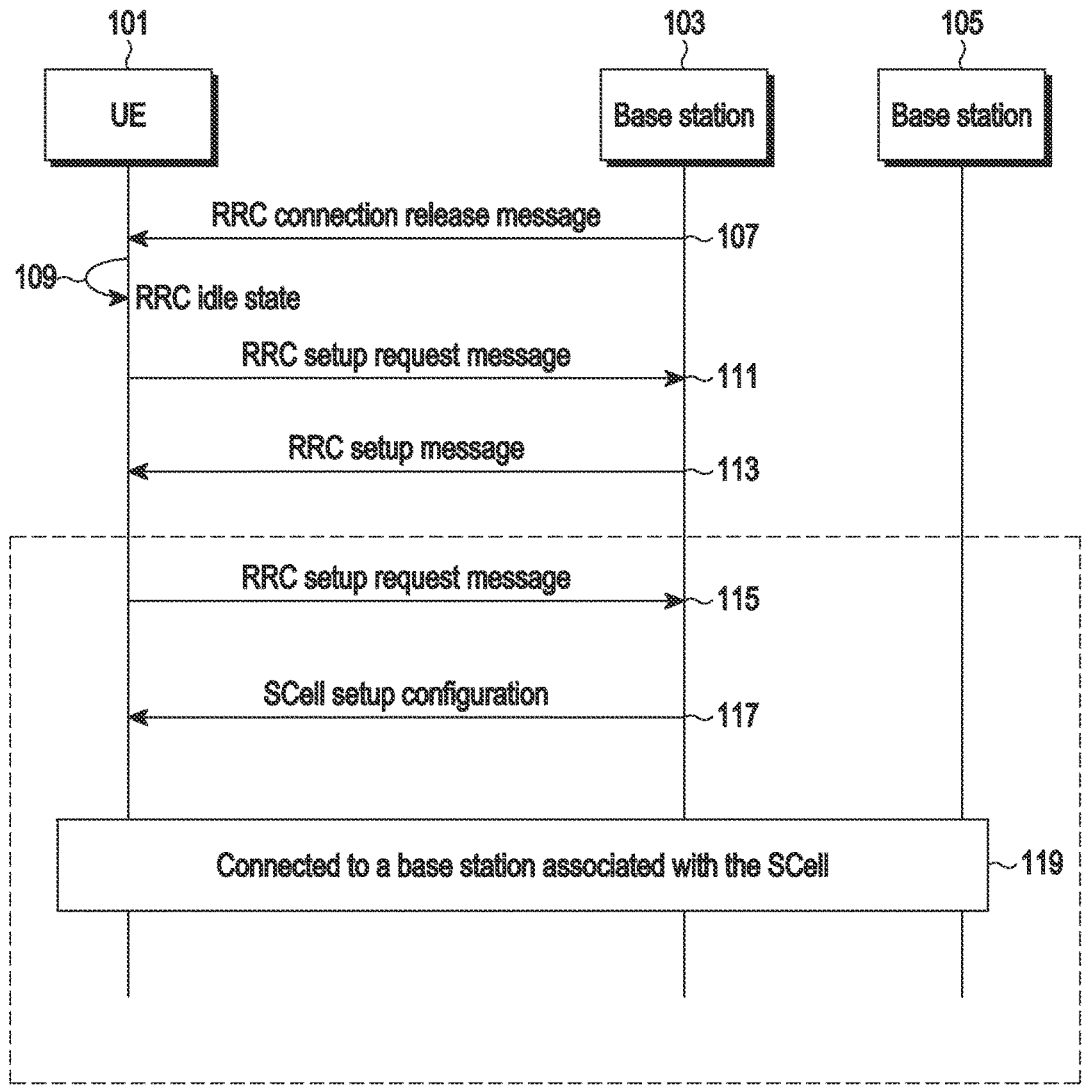
FIGS. 1A and 1B show sequence flow diagrams illustrating early measurement reporting and unnecessary addition of a Secondary Cell (SCell), according to the related art.
Figure 1B:
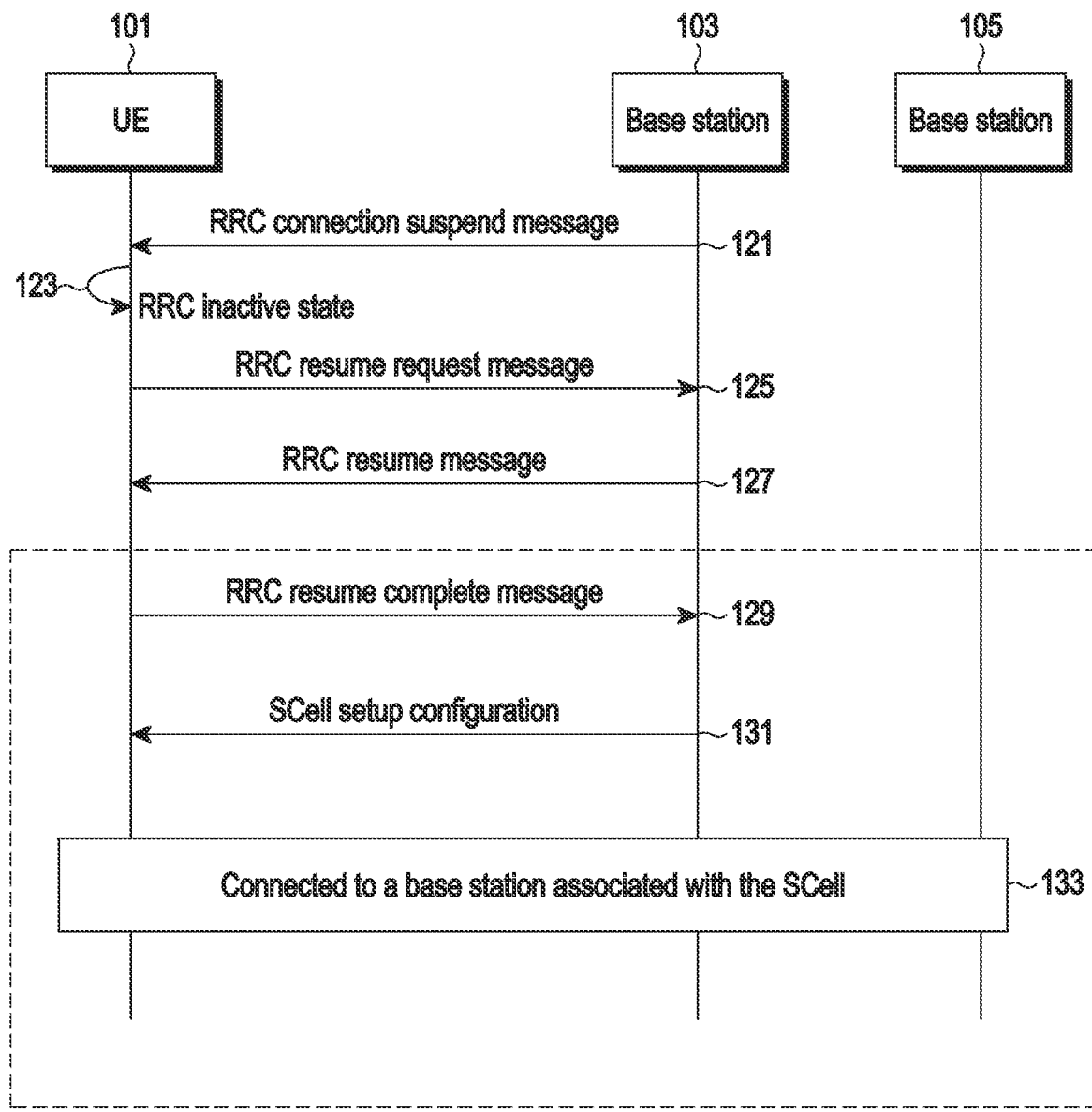

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, the word "exemplary" is used herein to mean "serving as an example, instance, or illustration." Any embodiment or implementation of the subject matter described herein as "exemplary" is not necessarily to be construed as preferred or advantageous over other embodiments.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Embodiments of the disclosure relate to a method, and a user equipment (UE) for performing an early measurement of one or more frequencies for secondary cell (SCell) setup. In the disclosure, the UE determines whether a service, initiated with a base station associated with a PCell supporting the early measurement feature, belongs to one of a first service set, and a second service set. The UE utilizes one or more information elements (IE) in at least one of transmitted messages and received messages to perform such determination. The one or more IEs include one of an establishment cause IE and an EstablishmentCause-5th generation core (5GC) IE in one of a radio resource control (RRC) setup request message and an RRC connection request message; a resume cause IE in one of an RRC resume request message, and an RRC connection resume request message; one of a paging cause IE and a paging cause indication IE in a paging message, and a voice fallback indication IE in one of a mobility from nr command message and an RRC release message. When the initiated service belongs to the first service set, the UE temporarily terminates one of the early measurement of the one or more frequencies for the SCell setup, and transmission of an early measurement report comprising one or more frequencies for the SCell setup to the base station associated with the PCell. This reduces signaling overhead associated with the early measurement of frequencies in a network environment. Consequently, power consumption associated with unnecessary signaling is reduced at both the UE and the base station. As unnecessary SCell addition is prevented, efficient utilization of network resources is ensured.

Figure 2A:
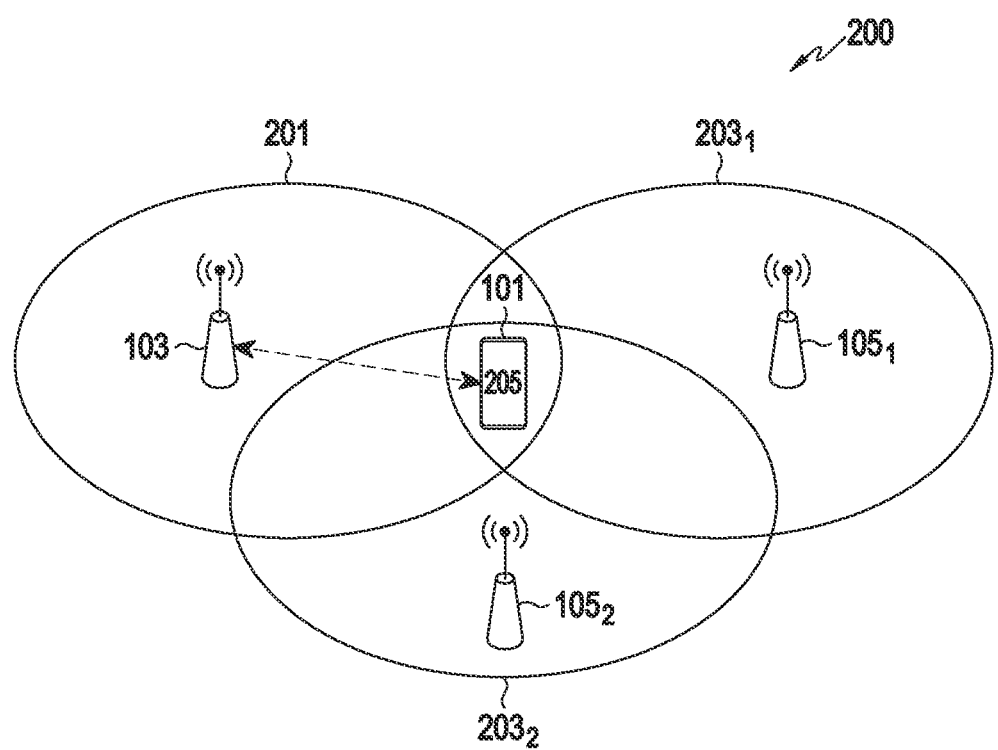
FIGS. 2A and 2B show environments for performing an early measurement of one or more frequencies for a secondary cell (SCell) setup according to various embodiments of the disclosure.
Figure 2B:
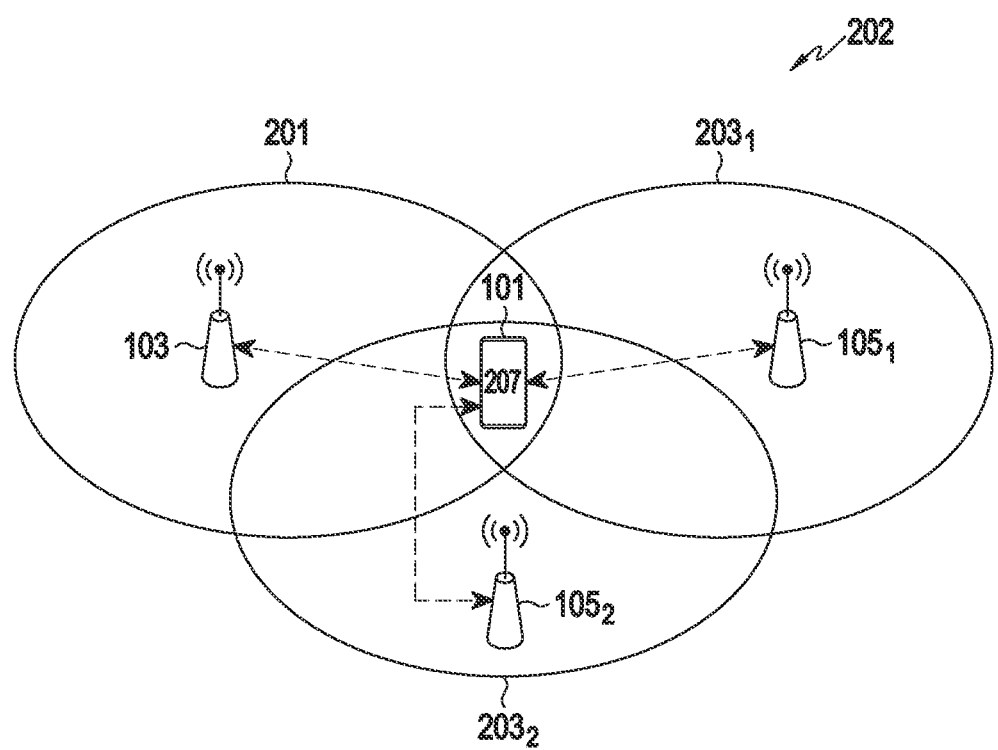

FIGS. 2A and 2B show environments for performing an early measurement of one or more frequencies for secondary cell (SCell) setup according to various embodiments of the disclosure.

Referring to FIGS. 2A and 2B, each of the environments 200, 202 may comprise a base station 103 associated with a primary cell (PCell) 201, one or more base stations $105_1$, $105_2$ (herein referred as base station 105 associated with a SCell) associated with respective one or more SCells $203_1$, $203_2$ (herein referred as Scell 203) and a user equipment (UE) 101. Each of the PCell 201 and the SCells $203_1$, $203_2$ may be one of a new radio (NR) cell and a long-term evolution (LTE) cell. The UE 101 may be, but is not limited to, a smartphone, a laptop, a desktop, a personal digital assistant (PDA), and a tablet. The UE 101 may be capable of performing early measurement of frequencies to reduce delay in setting up carrier aggregation (CA) or dual connectivity (DC). The UE 101 may camp on the PCell 201, which supports early measurement feature for SCell setup.

The UE 101 may initiate a service with a base station 103 associated with the PCell 201. The UE 101 may be in one of a radio resource control (RRC) idle state or RRC inactive state. While performing transition from one of the RRC idle state and the RRC inactive state to an RRC connected state, the UE 101 may initiate one of an RRC connection procedure and an RRC resume procedure with the base station 103 associated with the PCell 201.

In the RRC connection procedure, the UE 101 may transmit one of an RRC setup request message and an RRC connection request message to the base station 103 associated with the PCell 201 along with one of an EstablishmentCause information element (IE) and an EstablishmentCause-5GC IE for performing a transition from the RRC idle state to the RRC connected state. The UE 101 may transmit the RRC setup request message while camping on the NR cell, and may transmit the RRC connection request message while camping on the LTE cell.

In the RRC resume procedure, the UE 101 may transmit one of an RRC resume request message and an RRC connection resume request message to the base station 103 associated with the PCell 201 along with a ResumeCause IE for performing a transition from the RRC inactive state to the RRC connected state. The UE 101 may transmit the RRC resume request message while camping on the NR cell, and may transmit the RRC connection resume request message while camping on the LTE cell.

The UE 101 may determine whether the initiated service belongs to one of a first service set 205 and a second service set 207 based on one of an EstablishmentCause information element (IE) and an EstablishmentCause-5GC IE. The first service set 205 may comprise at least one of a mobile originated (mo)-signaling, a mo-VoiceCall, a mo-VideoCall, a mo-Short message service (SMS), an emergency and a delayTolerantAccess. The second service set 207 may comprise at least one of mo-Data, highPriorityAccess, multimedia priority service (mps)-PriorityAccess, and mission critical service (mcs)-PriorityAccess.

During RRC connection procedure, the UE 101 may determine one of the EstablishmentCause information element (IE) and the EstablishmentCause-5GC IE from one of the RRC setup request message and the RRC connection request message. The UE 101 may determine whether the initiated service belongs to one of the first service set 205 and the second service set 207 based on one of the EstablishmentCause IE and the EstablishmentCause-5GC IE.

During the RRC resume procedure, the UE 101 may determine the ResumeCause IE from one of the RRC resume request message and the RRC connection resume request message. The UE 101 may determine whether the initiated service belongs to one of the first service set 205 and the second service set 207 based on the ResumeCause IE.

The UE 101 may analyze a paging message received from the base station 103 associated with the PCell 201 when the initiated service is a mobile terminated (mt)-Access. The UE 101 may determine that the initiated service belongs to the first service set 205 when one of a paging cause IE and a paging cause indication IE is included in the paging message and is associated with one of voice services and SMS services. Alternatively, the UE 101 may determine that the initiated service belongs to the second service set 207 when one of the paging cause IE and the paging cause indication IE is included in the paging message and is associated with data services.

The UE 101 may temporarily terminate one of the early measurement of the one or more frequencies for the SCell setup, and transmission of an early measurement report comprising the one or more frequencies for the SCell setup to the base station 103 associated with the PCell 201 when the initiated service belongs to the first service set 205. Upon determining that the initiated service belongs to the first service set 205 based on the EstablishmentCause IE or the EstablishmentCause-5GC IE, the UE 101 may transmit one of the RRC setup complete message and RRC connection setup complete message without indicating idleMeasAvailable IE to the base station 103 associated with the PCell 201, during RRC connection procedure. During the RRC resume procedure, the UE 101 may transmit one of the RRC resume complete message and RRC connection resume complete message without indicating idleMeasAvailable IE to the base station 103 associated with the PCell 201. Due to absence of the idleMeasAvailable IE in the received messages, the PCell 201 may stop triggering the SCell setup. The UE 101 may temporarily terminate performing the early measurement of one or more frequencies. Accordingly, the UE 101 may remain connected to only the base station 103 associated with the PCell 201, when the initiated service belongs to the first service set 205, as illustrated in FIG. 2A.

The UE 101 may perform the early measurement of the one or more frequencies for the SCell setup and transmitting the early measurement report to the base station 103 associated with the PCell 201 when the initiated service belongs to the second service set 207. The UE 101 may transmit one of the RRC setup complete message and RRC connection setup complete message along with the idleMeasAvailable IE to the base station 103 associated with the PCell 201, during RRC connection procedure. In case of RRC resume procedure, the UE 101 may transmit one of the RRC resume complete message and RRC connection resume complete message along with the idleMeasAvailable IE to the base station 103 associated with the PCell 201. Upon receiving the idleMeasAvailable IE in one of the RRC setup complete message, the RRC resume complete message, RRC connection setup complete message and RRC connection resume complete message, the base station 103 associated with the PCell 201 may trigger the SCell setup. Accordingly, the UE 101 may be connected to one or more base stations 105₁, 105₂ associated with the SCells 203₁, 203₂ along with the base station 103 associated with the PCell 201, when the initiated service belongs to the second service set 207, as illustrated in FIG. 2B.

The UE 101 may receive at least one of a MobilityFromNRCommand message and an RRC Release message from the base station 103 associated with the PCell 201 when the UE 101 is in an RRC connected state. Here, the PCell 201 may be a NR cell. The MobilityFromNRCommand message may be received for performing handover from a NR to evolved universal terrestrial radio access (E-UTRA). The RRC release message may comprise at least one of a plurality of NR carrier frequencies excluding a NR carrier frequency of the PCell 201, and a plurality of E-UTRA carrier frequencies for internet protocol (IP) multimedia subsystem (IMS) voice services. The UE 101 may determine whether a voiceFallbackIndication IE is included in at least one of the MobilityFromNRCommand message and the RRC release message. The UE 101 may temporarily terminate the early measurement of the one or more frequencies for the SCell setup if the voiceFallbackIndication IE is included in at least one of the MobilityFromNRCommand message and the RRC release message.

Figure 3:
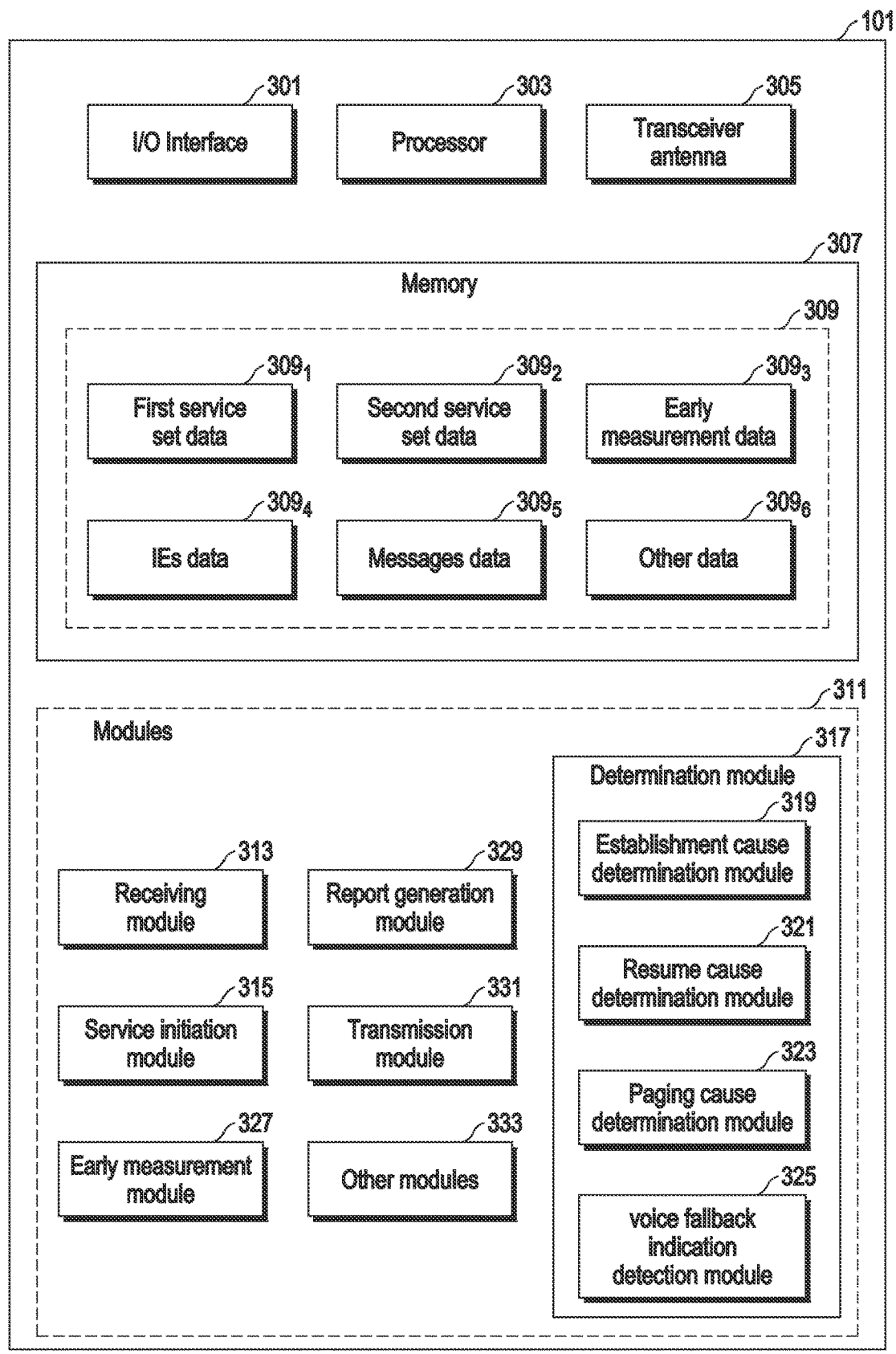
FIG. 3 shows a block diagram of a user equipment (UE) according to an embodiment of the disclosure.

FIG. 3 shows a block diagram of a UE according to an embodiment of the disclosure.

Referring to FIG. 3, the UE 101 may include an I/O Interface 301, at least one processor 303, at least one transceiver antenna 305, and a memory 307. The I/O Interface 301 may be communicatively coupled with a base station 103 associated with a PCell 201, which supports early measurement of one or more frequencies for the SCell setup. The I/O Interface 301 may also be configured to transmit an early measurement report to the base station 103 associated with the PCell 201. The I/O Interface 301 may be configured to receive one or more messages from the base station 103 associated with the PCell 201. Here, the I/O Interface 301 may be associated with the at least one transceiver antenna 305 for performing communication with the base station 103 associated with the PCell 201.

The processor 303 may initiate a service with the base station 103 associated with the PCell 201. The processor 303 may determine whether the initiated service belongs to one of a first service set 205 and a second service set 207. Based on the determination, the processor 303 may control performing the early measurement of the one or more frequencies for the SCell setup and transmitting the early measurement report to the base station 103 associated with the PCell 201. To perform the aforesaid method steps, the processor 303 may utilize various modules and memory 307 of the UE 101.

In the UE 101, the memory 307 may store data 309 received through the I/O Interface 301, the processor 303, and modules 311. The data 309 may include first service set data 309₁, second service set data 309₂, early measurement data 309₃, information elements (IEs) data 309₄, messages data 309₅, and other data 309₆. The first service set data 309₁ may include mobile originated (mo)-signaling data, mo-VoiceCall data, mo-VideoCall data, mo-short message service (SMS) data, emergency data, and delayTolerantAccess data. The second service set data 309₂ may include mo-Data, highPriorityAccess, multimedia priority service (mps)-PriorityAccess, and mission critical service (mcs)-PriorityAccess. The early measurement data 309₃ may include one or more secondary frequencies measured for the SCell setup. The IEs data 309₄ may include data related to IEs which may be utilized to determine whether to perform the early measurement and transmit the early measurement report to the base station 103 associated with the PCell 201. The IEs data 309₄ may include data associated with EstablishmentCause IE, ResumeCause IE, Paging Cause IE, and voiceFallbackIndication IE. The messages data 309₅ may include data associated with messages that may be utilized for retrieving the aforesaid IEs. The messages data 309₅ may include data associated with RRC setup request messages, RRC connection request messages, RRC resume request messages, RRC connection resume request messages, paging messages, MobilityFromNRCommand messages and RRC Rrlease messages. The other data 309₆ may store other data, such as temporary data and temporary files generated by the processor 303, and the modules 311 for performing the various functions of the UE 101.

The data 309 stored in the memory 307 may be processed by the modules 311 of the UE 101. In an example, the modules 311 may be communicatively coupled to the processor 303 configured in the UE 101. The modules 311 may be present outside the memory 307 as shown in FIG. 3 and implemented as separate hardware. As used herein, the term modules 311 may refer to an application specific integrated circuit (ASIC), an electronic circuit, a processor (shared, dedicated, or group) and memory that execute one or more software or firmware programs, a combinational logic circuit, and/or other suitable components that provide the described functionality.

The modules 311 may include, for example, a receiving module 313, a service initiation module 315, a determination module 317, early measurement module 327, report generation module 329, transmission module 331, and other modules 333. The other modules 333 may be used to perform various miscellaneous functionalities of the UE 101. It will be appreciated that aforementioned modules 311 may be represented as a single module or a combination of different modules. Furthermore, a person of ordinary skill in the art will appreciate that in an implementation, the one or more modules 311 may be stored in the memory 307, without limiting the scope of the disclosure. The said modules 311 when configured with the functionality defined in the disclosure will result in a novel hardware.

The receiving module 313 may receive at least one of a paging message, a MobilityFromNRCommand message, and an RRC release message from the base station 103 associated with the PCell 201 through the I/O interface 301. The receiving module 313 may send the aforesaid messages to the determination module 317 for further processing. The receiving module 313 may also receive an RRC connection release message from the base station 103 associated with the PCell 201 through the I/O interface 301 for releasing an RRC connection, when the UE 101 is in RRC connected state. The receiving module 313 may send the RRC connection release message to the early measurement module 327 for further processing.

The service initiation module 315 may initiate a service with a base station 103 associated with a primary cell (PCell) 201 supporting the early measurement of the one or more frequencies for the SCell setup. To initiate the service, the service initiation module 315 may identify current state of the UE 101, and may initiate one of an RRC connection procedure and an RRC resume procedure based on the current state of the UE 101. Additionally, the service initiation module 315 may determine type of the PCell 201 and may select type of messages to be transmitted to the base station 103 associated with the PCell 201. As an example, the service initiation module 315 may identify whether the UE 101 is in an RRC idle state or an RRC inactive state. When the UE 101 is in an RRC idle state, the service initiation module 315 may initiate the RRC connection procedure. If the PCell 201 is of NR type, the service initiation module 315 may transmit an RRC setup request message to the next generation node B (gNB) through the transmission module 331. Alternatively, the service initiation module 315 may transmit an RRC connection request message to the evolved node B (eNB) through the transmission module 331, if the PCell 201 is of LTE type. Further, the service initiation module 315 may initiate the RRC resume procedure. If the PCell 201 is of NR type, the service initiation module 315 may transmit an RRC resume request message to the gNB through the transmission module 331. Alternatively, the service initiation module 315 may transmit an RRC connection resume request message to the eNB through the transmission module 331, if the PCell 201 is of LTE type.

The determination module 317 may determine whether the service initiated by the service initiation module 315 belongs to one of a first service set 205 and a second service set 207. The determination module 317 may receive the paging message, the MobilityFromNRCommand message, and RRC release message from the receiving module 313. The determination module may comprise an establishment cause determination module 319, a resume cause determination module 321, a paging cause determination module 323, and a voice fallback indication detection module 325. When the service initiation module 315 initiates the RRC connection procedure, the determination module 317 may trigger the establishment cause determination module 319 for processing one of the RRC setup request message and the RRC connection request message. When the service initiation module 315 initiates the RRC connection procedure, the determination module 317 may trigger the resume cause determination module 321 for processing one of the RRC resume request message and the RRC connection resume request message. The determination module 317 may trigger the voice fallback indication detection module 325 upon receiving the MobilityFromNRCommand message, and the RRC Release message from the receiving module 313.

Upon triggering, the establishment cause determination module 319 may determine an EstablishmentCause IE from one of the RRC setup request message and the RRC connection request message, transmitted by the transmission module 331. Further, the establishment cause determination module 319 may determine whether the service initiated by the service initiation module 315 belongs to one of the first service set 205 and the second service set 207 based on the EstablishmentCause IE. Based on the determination, the establishment cause determination module 319 may control operations of the early measurement module 327, and the report generation module 329.

As an example, the establishment cause determination module 319 may identify that the EstablishmentCause IE is associated with one of the mo-Data, the highPriorityAccess, the mps-PriorityAccess, and the mcs-PriorityAccess. Based on the identification, the establishment cause determination module 319 may determine that the service initiated by the service initiation module 315 belongs to the second service set 207. Accordingly, the establishment cause determination module 319 may trigger the early measurement module 327 for performing the early measurement of the one or more frequencies for the SCell setup. The establishment cause determination module 319 may also trigger the report generation module 329 for generating the early measurement report to perform early measurement reporting through the transmission module 331.

Alternatively, the establishment cause determination module 319 may identify that the EstablishmentCause IE is associated with one of the mo-Signaling, the mo-VoiceCall, the mo-VideoCall, the mo-SMS, the emergency, and the delayTolerantAccess. Based on the identification, the establishment cause determination module 319 may determine that the service initiated by the service initiation module 315 belongs to the first service set 205. Accordingly, the establishment cause determination module 319 may deactivate the early measurement module 327 for temporarily terminating the early measurement of the one or more frequencies. The establishment cause determination module 319 may also deactivate the report generation module 329 for temporarily terminating the transmission of the early measurement report to the base station 103 associated with the PCell 201.

Additionally, the establishment cause determination module 319 may identify that the initiated service is a mobile terminated (mt)-Access based on the EstablishmentCause IE. The establishment cause determination module 319 may trigger the paging cause determination module 323 to determine whether the initiated service belongs to one of the first service set 205, and the second service set 207. Upon receiving a determination result from the paging cause determination module 323, the establishment cause determination module 319 may control the operations of the early measurement module 327, and the report generation module 329 as described earlier.

Upon triggering, the resume cause determination module 321 may determine a ResumeCause IE from one of the RRC Resume Request message and an RRC Connection Resume Request message, transmitted by the transmission module 331. The resume cause determination module 321 may determine whether the service initiated by the service initiation module 315 belongs to one of the first service set 205 and the second service set 207 based on the ResumeCause IE. Based on the determination, the resume cause determination module 321 may control operations of the early measurement module 327, and the report generation module 329.

As an example, the resume cause determination module 321 may identify that the ResumeCause IE is associated with one of the mo-Data, the highPriorityAccess, the mps-PriorityAccess, and the mcs-PriorityAccess. Based on the identification, the resume cause determination module 321 may determine that the service initiated by the service initiation module 315 belongs to the second service set 207. Accordingly, the resume cause determination module 321 may trigger the early measurement module 327 for performing the early measurement of the one or more frequencies for the SCell setup, and may trigger the report generation module 329 for generating the early measurement report to perform early measurement reporting through the transmission module 331.

Alternatively, the resume cause determination module 321 may identify that the ResumeCause IE is associated with one of the mo-signaling, the mo-VoiceCall, the mo-VideoCall, the mo-short message service (SMS), the emergency, and the delayTolerantAccess. Based on the identification, the resume cause determination module 321 may determine that the service initiated by the service initiation module 315 belongs to the first service set 205. Accordingly, the resume cause determination module 321 may deactivate the early measurement module 327 for temporarily terminating the early measurement of the one or more frequencies, and may deactivate the report generation module 329 for temporarily terminating the transmission of the early measurement report to the base station 103 associated with the PCell 201.

Additionally, the resume cause determination module 321 may identify that the initiated service is a mobile terminated (mt)-Access based on the ResumeCause IE. Further, the resume cause determination module 321 may trigger the paging cause determination module 323 to determine whether the initiated service belongs to one of the first service set 205, and the second service set 207. Upon receiving the determination result from the paging cause determination module 323, the resume cause determination module 321 may control the operations of the early measurement module 327, and the report generation module 329 as described earlier.

Upon triggering by one of the establishment cause determination module 319 and the resume cause determination module 321, the paging cause determination module 323 may analyze the paging message received from the receiving module 313 to determine whether the initiated service belongs to the first service set 205 and the second service set 207. The paging cause determination module 323 may determine that the initiated service belongs to the first service set 205 when the paging cause IE in the paging message is associated with one of voice services and SMS services. Alternatively, the paging cause determination module 323 may determine that the initiated service belongs to the second service set 207 when the paging cause IE in the paging message is associated with data services. Accordingly, the paging cause determination module 323 may send the determination result to one of the establishment cause determination module 319 and the resume cause determination module 321 for further processing.

The voice fallback indication detection module 325 may analyze one of the MobilityFromNRCommand message and the RRC release message received from the receiving module 313 to determine whether a voiceFallbackIndication IE is included in one of the aforesaid messages. The MobilityFromNRCommand message may be received from the base station 103 associated with the PCell 201 for performing handover from a NR to evolved universal terrestrial radio access (E-UTRA). The RRC Release message may comprise at least one of a plurality of NR carrier frequencies excluding a NR carrier frequency of the PCell 201, and a plurality of EUTRA carrier frequencies for internet protocol (IP) multimedia subsystem (IMS) voice services. When the voiceFallbackIndication IE is not included in one of the MobilityFromNRCommand message and the RRC release message, the voice fallback indication detection module 325 may trigger the early measurement module 327 for performing the early measurement of the one or more frequencies for the SCell setup, and may trigger the report generation module 329 for generating the early measurement report to perform early measurement reporting through the transmission module 331. Alternatively, the voice fallback indication detection module 325 may deactivate the early measurement module 327 and the report generation module 329 for temporarily terminating one of the early measurement of the one or more frequencies, and the transmission of the early measurement report to the base station 103 associated with the PCell 201, upon determining that the voiceFallbackIndication IE is included in one of the MobilityFromNRCommand message and the RRC release message.

Upon triggering by one of the establishment cause determination module 319, the resume cause determination module 321, and the voice fallback indication detection module 325, the early measurement module 327 may perform early measurement of the one or more frequencies for the SCell setup based on a measIdleConfig IE in the RRC connection release message received from the receiving module 313. The measIdleConfig may indicate measurement configuration to be stored and used by the UE 101 while in RRC idle state or an RRC inactive state. Further, the early measurement module 327 may send the measured one or more frequencies to the report generation module 329 for further processing. Alternatively, the early measurement module 327 may terminate perform early measurement of the one or more frequencies upon deactivation by one of the establishment cause determination module 319, the resume cause determination module 321, and the voice fallback indication detection module 325.

Upon triggering by one of the establishment cause determination module 319, the resume cause determination module 321, and the voice fallback indication detection module 325, the report generation module 329 may generate an early measurement report based on the one or more frequencies received from the early measurement module 327. The report generation module 329 may send the early measurement report to the transmission module 331 for further processing.

The transmission module 331 may transmit one of the RRC setup request message, the RRC connection request message, the RRC resume request message and the RRC connection resume request message received from the service initiation module 315 to the base station 103 associated with the PCell 201. The transmission module 331 may transmit one of the RRC setup request message and the RRC connection request message for transitioning the UE 101 from the RRC idle state to the RRC connected state. The transmission module 331 may transmit one of the RRC Resume Request message and the RRC connection resume request message for transitioning the UE 101 from the RRC inactive state to the RRC connected state. The transmission module 331 may transmit the early measurement report received from the report generation module 329 to the base station 103 associated with the PCell 201.

Figure 4:
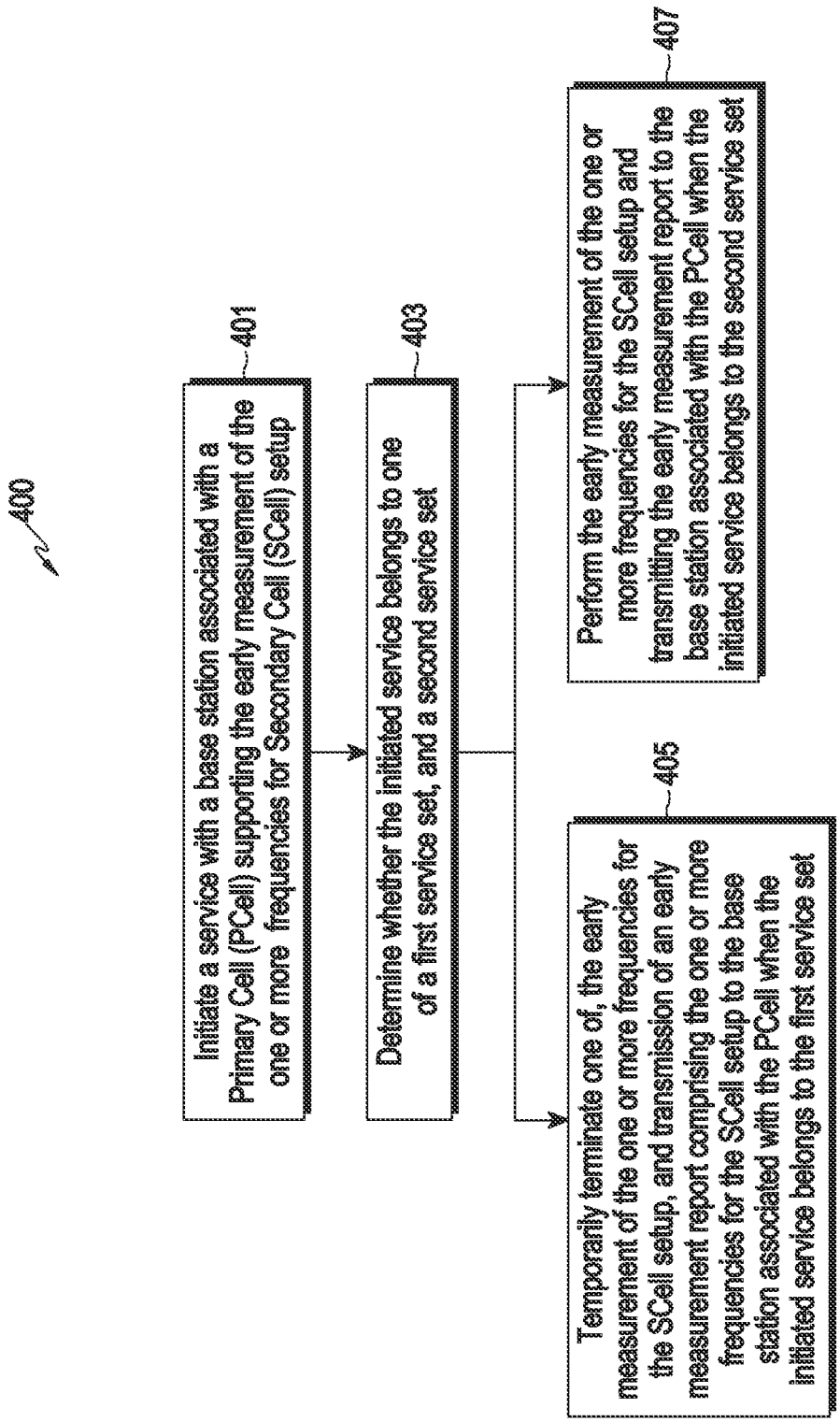
FIG. 4 shows a flow chart illustrating a method for performing an early measurement of one or more frequencies for a secondary cell (SCell) setup according to an embodiment of the disclosure.

FIG. 4 shows a flow chart illustrating a method for performing an early measurement of one or more frequencies for secondary cell (SCell) setup according to an embodiment of the disclosure.

Referring to FIG. 4, the method 400 includes one or more blocks illustrating a method for performing an early measurement of one or more frequencies for SCell setup. The order in which the method 400 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At operation 401, the method may include initiating, by a UE 101, a service with a base station 103 associated with a primary cell (PCell) 201 supporting the early measurement of the one or more frequencies for the SCell setup. The base station 103 associated with the PCell 201 may operate at a primary frequency. The base station 103 may be one of a gNB associated with a 5G NR cell and an eNB associated with fourth generation (4G) LTE cell.

At operation 403, the method may include determining, by the UE 101, whether the initiated service belongs to one of a first service set 205, and a second service set 207. The first service set 205 may comprise at least one of a mobile originated (mo)-signaling, a mo-VoiceCall, a mo-VideoCall, a mo-short message service (SMS), an emergency, and a delayTolerantAccess. The second service set 207 may comprise at least one of mo-Data, highPriorityAccess, multimedia priority service (mps)-PriorityAccess, and mission critical service (mcs)-PriorityAccess. To determine whether the initiated service belongs to one of the first service set 205 and the second service set 207, an EstablishmentCause information element (IE) or an EstablishmentCause-5GC IE may be determined from one of a radio resource control (RRC) setup request message and an RRC connection request message. At least one of these messages may be transmitted to the base station 103 associated with the PCell 201, when the UE 101 is performing a transition from an RRC idle state to an RRC connected state. Alternatively, a ResumeCause IE may be determined from one of an RRC resume request message and an RRC connection resume request message. At least one of these messages may be transmitted to the base station 103 associated with the PCell 201 when the UE 101 is performing a transition from an RRC inactive state to an RRC connected state. Based on at least one of the EstablishmentCause IE, the EstablishmentCause-5GC IE and the ResumeCause IE, whether the initiated service belongs to one of the first service set 205 and the second service set 207 may be determined.

A paging message received from the base station 103 associated with the PCell 201 may be analyzed when the initiated service is a mobile terminated (mt)-Access. When a paging cause IE or paging cause indication IE is included in the paging message and is associated with one of voice services and SMS services, it may be determined that the initiated service belongs to the first service set 205. Alternatively, it may be determined that the initiated service belongs to the second service set 207 when the paging cause IE in the paging message is associated with data services.

At operation 405, the method may include temporarily terminating one of the early measurement of the one or more frequencies for the SCell setup, and transmission of an early measurement report comprising the one or more frequencies for the SCell setup to the base station 103 associated with the PCell 201 when the initiated service belongs to the first service set 205. One of an RRC setup complete message and an RRC resume complete message may be transmitted without indicating idleMeasAvailable IE to the base station 103 associated with the PCell 201, which may be one of the NR cell, and the LTE cell.

At least one of a MobilityFromNRCommand message and an RRC Release message may be received from the base station 103 associated with the Pcell 201 when the UE 101 is in an RRC connected state. The Pcell 201 may be the NR cell. The MobilityFromNRCommand message may be received from the base station 103 associated with the Pcell 201 for performing handover from a NR to E-UTRA. The RRC release message may comprise at least one of a plurality of NR carrier frequencies excluding a NR carrier frequency of the Pcell 201, and a plurality of EUTRA carrier frequencies for IMS voice services. When a voiceFallbackIndication IE is included in at least one of the MobilityFromNRCommand message and the RRC release message, the early measurement of the one or more frequencies may be temporarily terminated for the Scell setup.

At operation 407, the method may include performing the early measurement of the one or more frequencies for the Scell setup and transmitting the early measurement report to the base station 103 associated with the Pcell 201 when the initiated service belongs to the second service set 207. Here, the initiated service may require Scell 203. Accordingly, the early measurement report may be transmitted from the UE 101 to the base station 103 associated with the Pcell 201. Further, Scell addition may be performed by the base station 103 associated with the Pcell 201 based on the early measurement report received from the UE 101.

Computing Device

Figure 5:
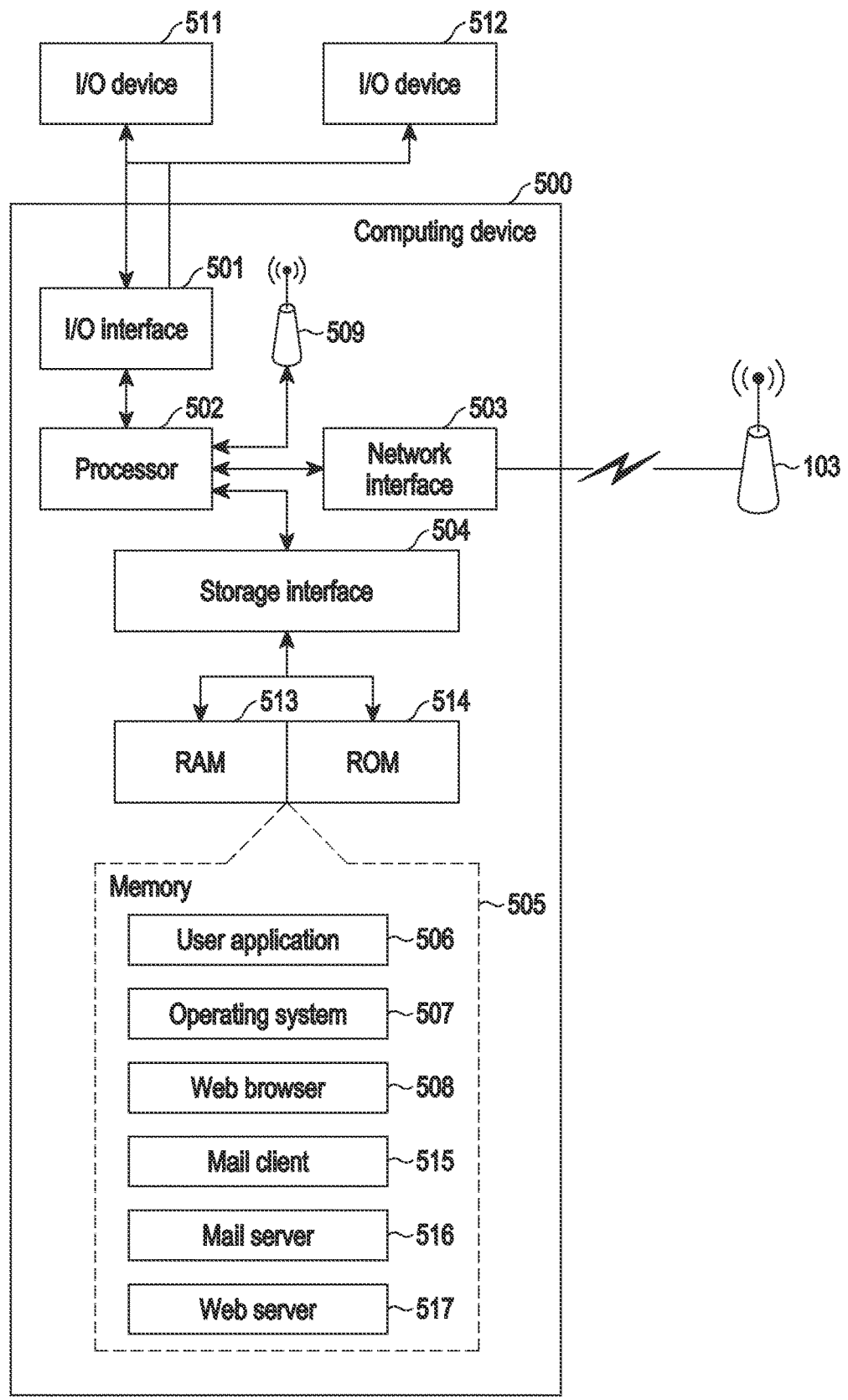
FIG. 5 shows a block diagram of a computing device for implementing embodiments according to an embodiment of the disclosure.

FIG. 5 illustrates a block diagram of a computing device 500 according to an embodiment of the disclosure.

Referring to FIG. 5, the computing device 500 may be a UE for performing an early measurement of one or more frequencies for Scell setup. The computing device 500 may include a central processing unit (CPU) or processor 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, Institute of Electrical and Electronics Engineers (IEEE)-1394, serial bus, universal serial bus (USB), infrared, PS/2, bayonet neill-concelman (BNC), coaxial, component, composite, digital visual interface (DVI), high-definition multimedia interface (HDMI), radio frequency (RF) antennas, S-Video, video graphics array (VGA), IEEE 802.n/b/g/n/x, bluetooth, cellular (e.g., code-division multiple access (CDMA), high-speed packet access (HSPA+), global system for mobile communications (GSM), LTE or the like), etc. Using the I/O interface 501, the computing device 500 may communicate with one or more I/O devices 511 and 512.

In some embodiments, the processor 502 may be disposed in communication with a wireless communication network via a network interface 503 and a transceiver 509. The network interface 503 may communicate with the wireless communication network. The network interface 503 may employ connection protocols including, without limitation, direct connect, ethernet (e.g., twisted pair 10/100/1000 Base T), transmission control protocol/internet protocol (TCP/IP), token ring, IEEE 802.11a/b/g/n/x, etc.

The wireless communication network may be implemented as one of the several types of networks, such as intranet or local area network (LAN) and such within the organization. The wireless communication network may either be a dedicated network or a shared network, which represents an association of several types of networks that use a variety of protocols, for example, hypertext transfer protocol (HTTP), TCP/IP, wireless application protocol (WAP), etc., to communicate with each other. Further, the communication network may include a variety of network devices, including routers, bridges, servers, computing devices, storage devices, etc.

The processor 502 may be disposed in communication with a memory 505 (e.g., random access memory (RAM) 513, read only memory (ROM) 514, etc. via a storage interface 504. The storage interface 504 may connect to memory 505 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 505 may store a collection of program or database components, including, without limitation, user application 506, an operating system 507, a web browser 508, mail client 515, mail server 516, web server 517 and the like. In some embodiments, computing device 500 may store user/application data 506, such as the data, variables, records, etc. as described in this disclosure. Such databases may be implemented as fault-tolerant, relational, scalable, secure databases such as Oracle® or Sybase®.

The operating system 507 may facilitate resource management and operation of the computing device 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computing device 500, such as cursors, icons, check boxes, menus, windows, widgets, etc. graphical user interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include random access memory (RAM), read-only memory (ROM), volatile memory, nonvolatile memory, hard drives, compact disc (CD) ROMs, digital video disc (DVDs), flash drives, disks, and any other known physical storage media.

Advantages of the embodiment of the disclosure are illustrated herein.

In an embodiment, the disclosure provides a method, and a user equipment (UE) for performing an early measurement of one or more frequencies for secondary cell (Scell) setup.

In an embodiment, the disclosure enables the UE to decide whether to perform early measurement of one or more frequencies and transmit an early measurement report to the base station associated with the UE based on type of service initiated by the UE. This reduces signaling overhead in network environment.

In an embodiment, the disclosure facilities power conservation at the UE and the base station associated with the Pcell and efficient utilization of network resources by avoiding unnecessary cell measurements, frequency measurement reporting and addition of Scells.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the disclosure are intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for power saving through optimized early measurement of one or more frequencies for secondary cell (Scell) setup in cellular network, the method comprising:
    initiating, by a user equipment (UE), a service with a base station associated with a primary cell (Pcell) supporting the early measurement of the one or more frequencies for the Scell setup;
    determining, by the UE, whether the initiated service belongs to one of a first service set and a second service set, wherein a service included in the first service set does not require Scells and a service included in the second service set requires Scells;
    in response that the initiated service belongs to the first service set,
        temporarily terminating at least one of the early measurement of the one or more frequencies for the Scell setup, and transmission of an early measurement report comprising the one or more frequencies for the Scell setup to the base station associated with the Pcell, and
        transmitting one of a radio resource control (RRC) setup complete message, an RRC resume complete message, an RRC connection setup complete message, and an RRC connection resume complete message without indicating idleMeasAvailable information element (IE) to the base station associated with the Pcell; and
    in response that the initiated service belongs to the second service set:
        performing the early measurement of the one or more frequencies for the Scell setup and transmitting the early measurement report to the base station associated with the Pcell, and
        transmitting one of a radio resource control (RRC) setup complete message, an RRC resume complete message, an RRC connection setup complete message, and an RRC connection resume complete message along with idleMeas Available IE to the base station associated with the Pcell.

2. The method of claim 1, wherein the determining of whether the initiated service belongs to one of the first service set and the second service set comprises:
    in response that the UE is performing a transition from a RRC idle state to an RRC connected state, determining one of an EstablishmentCause IE and an EstablishmentCause-5$^{th}$ generation core (5GC) IE from one of an RRC setup request message and an RRC connection request message, transmitted to the base station associated with the Pcell;
    in response that the UE is performing a transition from an RRC inactive state to the RRC connected state, determining a ResumeCause IE from one of an RRC resume request message and an RRC connection resume request message, transmitted to the base station associated with the Pcell; and
    determining whether the initiated service belongs to one of the first service set and the second service set based on at least one of the EstablishmentCause IE, EstablishmentCause-5GC IE and the ResumeCause IE.

3. The method of claim 1, wherein the first service set comprises at least one of a mobile originated (mo)-signaling, a mo-VoiceCall, a mo-VideoCall, a mo-short message service (SMS), an emergency and a delayTolerantAccess in one of new radio (NR) communication and long-term evolution (LTE) communication.

4. The method of claim 1, wherein the second service set comprises at least one of mo-Data, highPriority Access, multimedia priority service (mps)-Priority Access, and mission critical service (mcs)-Priority Access.

5. The method of claim 1, further comprising:
    receiving a paging message from the base station associated with the Pcell when the initiated service is a mobile terminated (mt)-Access;
    determining that the initiated service belongs to the first service set when one of a paging cause (IE) and a paging cause indication IE is included in the paging message and is associated with one of voice services and short message service (SMS) services; and
    determining that the initiated service belongs to the second service set when one of the paging cause IE and the paging cause indication IE is included in the paging message and is associated with data services.

6. The method of claim 1,
    wherein the Pcell is one of a new radio (NR) cell and a long-term evolution (LTE) cell.

7. The method of claim 1, further comprising:
    receiving at least one of a MobilityFromNRCommand message and an RRC release message from the base station associated with the Pcell when the UE is in an RRC connected state, wherein the Pcell is a new radio (NR) cell; and
    temporarily terminating the early measurement of the one or more frequencies for the Scell setup when a voiceFallbackIndication (IE) is included in at least one of the MobilityFromNRCommand message and the RRC release message.

8. The method of claim 7, wherein the MobilityFromNRCommand message is received from the base station associated with the Pcell for performing handover from a NR to evolved universal terrestrial radio access (E-UTRA).

9. The method of claim 7, wherein the RRC release message comprises at least one of a plurality of NR carrier frequencies excluding a NR carrier frequency of the Pcell, and a plurality of evolved universal terrestrial radio access (E-UTRA) carrier frequencies for internet protocol (IP) multimedia subsystem (IMS) voice services.

10. The method of claim 1, wherein the initiated service requires the Scell.

11. A user equipment (UE) for power saving through optimized early measurement of one or more frequencies for secondary cell (Scell) setup in cellular network, the UE comprising:
    memory storing one or more computer programs; and
    one or more processors communicatively coupled to the memory,
    wherein the one or more computer programs include computer-executable instructions that, when executed by the one or more processors individually or collectively, cause the UE to:

initiate a service with a base station associated with a primary cell (Pcell) supporting the early measurement of the one or more frequencies for the Scell setup, determine whether the initiated service belongs to one of a first service set, and a second service set, wherein a service included in the first service set does not require Scells and a service included in the second service set requires Scells, in response that the initiated service belongs to the first service set:

temporarily terminating at least one of the early measurement of the one or more frequencies for the Scell setup, and transmission of an early measurement report comprising the one or more frequencies for the Scell setup to the base station associated with the Pcell, and transmitting one of a radio resource control (RRC) setup complete message, an RRC resume complete message, an RRC connection setup complete message, and an RRC connection resume complete message without indicating idleMeasAvailable information element (IE) to the base station associated with the Pcell, and in response that the initiated service belongs to the second service set:

performing the early measurement of the one or more frequencies for the Scell setup and transmitting the early measurement report to the base station associated with the Pcell, and transmitting one of a radio resource control (RRC) setup complete message, an RRC resume complete message, an RRC connection setup complete message, and an RRC connection resume complete message along with idleMeasAvailable IE to the base station associated with the Pcell.

12. The UE of claim 11, wherein the one or more computer programs further include computer-executable instructions that, when executed by the one or more processors individually or collectively, cause the UE to perform at least one of:

in response that the UE is performing a transition from a RRC idle state to an RRC connected state, determining one of an EstablishmentCause IE and an EstablishmentCause-5$^{th}$ generation core (5GC) IE from one of an RRC setup request message and an RRC connection request message, transmitted to the base station associated with the Pcell when the UE is performing a transition from an RRC idle state to an RRC connected state, in response that the UE is performing a transition from an RRC inactive state to the RRC connected state, determining a ResumeCause IE from one of an RRC resume request message and an RRC connection resume request message, transmitted to the base station associated with the Pcell, and determining whether the initiated service belongs to one of the first service set and the second service set based on at least one of the EstablishmentCause IE, the EstablishmentCause-5GC IE and the ResumeCause IE.

13. The UE of claim 11, wherein the first service set comprises at least one of a mobile originated (mo)-signaling, a mo-VoiceCall, a mo-VideoCall, a mo-short message service (SMS), an emergency and a delay TolerantAccess in one of new radio (NR) cell communication and long-term evolution (LTE) communication.

14. The UE of claim 11, wherein the second service set comprises at least one of mo-Data, highPriority Access, multimedia priority service (mps)-Priority Access, and mission critical service (mcs)-Priority Access.

15. The UE of claim 11, wherein the one or more computer programs further include computer-executable instructions that, when executed by the one or more processors individually or collectively, cause the UE to:

receive a paging message from the base station associated with the Pcell when the initiated service is a mobile terminated (mt)-Access, determine that the initiated service belongs to the first service set when one of a paging cause IE and a paging cause indication IE is included in the paging message and is associated with one of voice services and short message service (SMS) services, and determine that the initiated service belongs to the second service set when one of the paging cause IE and the paging cause indication IE is included in the paging message and is associated with data services.

16. The UE of claim 11, wherein the Pcell is one of a new radio (NR) cell and a long-term evolution (LTE) cell.

17. The UE of claim 11, wherein the one or more computer programs further include computer-executable instructions that, when executed by the one or more processors individually or collectively, cause the UE to:

receive at least one of a MobilityFromNRCommand message and an RRC release message from the base station associated with the Pcell when the UE is in an RRC connected state, wherein the Pcell is a new radio (NR) cell, and temporarily terminate the early measurement of the one or more frequencies for the Scell setup when a voiceFallbackIndication IE is included in at least one of the Mobility FromNRCommand message and the RRC release message.

18. The UE of claim 17, wherein the Mobility FromNRCommand message is received from the base station associated with the Pcell for performing handover from a NR to evolved universal terrestrial radio access (E-UTRA).

19. The UE of claimed in claim 17, wherein the RRC release message comprises at least one of a plurality of NR carrier frequencies excluding a NR carrier frequency of the Pcell, and a plurality of evolved universal terrestrial radio access (E-UTRA) carrier frequencies for internet protocol (IP) multimedia subsystem IMS) voice services.

20. The UE of claim 11, wherein the initiated service requires the Scell.

* * * * *